United States Patent
Takahashi

[15] 3,669,098
[45] June 13, 1972

[54] ENDOTRACHEAL TUBE
[72] Inventor: Nagashige Takahashi, Tokyo, Japan
[73] Assignee: Olympus Optical Co., Ltd., Tokyo, Japan
[22] Filed: Sept. 23, 1969
[21] Appl. No.: 860,272

[30] Foreign Application Priority Data
Oct. 5, 1968 Japan..................................43/86558

[52] U.S. Cl................................................128/6
[51] Int. Cl................................................A61b 1/06
[58] Field of Search..................................128/4, 6, 7, 10, 11

[56] References Cited

UNITED STATES PATENTS 3,162,214  12/1964  Bazinet..................................128/4 X
3,253,524  5/1966  Ashizawa..............................128/6 UX Primary Examiner—Richard A. Gaudet
Assistant Examiner—G. F. Dunne
Attorney—Otto John Munz

[57] ABSTRACT

An endotracheal tube comprising a flexible tube adapted to be bent in a plane and connected at its rearward end to a control body in the form of a cylindrical guide member. A pair of string means extend lengthwise in the wall of the flexible tube at diametrically opposite positions in the cross-section thereof in a plane perpendicular to the neutral plane of the flexure of the flexible tube with their forward ends secured to the forward end of the flexible tube while their rearward ends are connected to control means in the control body so as to be actuated thereby so that the flexible tube is rendered to be stiffened without allowing the flexure thereof by tightening the string means by operating the control means thereby facilitating the insertion of the endotracheal tube into the trachea while the flexible tube is rendered to be flexible by slackening the string means by the operation of the control means so that the operation of the bronchoscope inserted into the endotracheal tube is facilitated.

At least one light conducting optical system such as a fiber optical system is provided which extends lengthwise in the wall of the flexible tube with the forward end thereof terminating at the forward end of the flexible tube while the rearward end thereof is adapted to receive the illuminating light from an external light source at a position adjacent to the control body so as to illuminate the trachea into which the flexible tube is inserted by the light transmitted through the light conducting optical system to be forward end thereof for facilitating the insertion of the flexible tube which is now stiffened so as to maintain its rigid straight form into a desired position in the trachea by observing the trachea through the endotracheal tube.

4 Claims, 2 Drawing Figures

3,669,098

PATENTED JUN 13 1972

INVENTOR
NAGASHIGE TAKAHASHI
BY
ATTORNEY

ENDOTRACHEAL TUBE

FIELD OF THE INVENTION

The present invention relates to an endotracheal tube and, more particularly, to an endotracheal tube having a flexible tube yieldably bendable for facilitating the operation of a bronchoscope inserted therein but capable of being stiffened in the straight form so that the flexure of the flexible tube is prevented for facilitating the insertion of the same to the desired position in the trachea.

DESCRIPTION OF THE PRIOR ART

In general, in the inspection of bronchi by using a bronchoscope, an endotracheal tube is used together with the bronchoscope, which is inserted through the mouth of a living body into the trachea so as to guide the forward end portion of the bronchoscope inserted through the endotracheal tube thereby permitting the forward end portion of the bronchoscope to be inserted easily into the selected one of the bronchi to be inspected.

Heretofore, since a bronchoscope having a rigid guide tube to be inserted into the bronchus has been mainly utilized for the inspection of the bronchus, an endotracheal tube having a rigid metallic tube with a small lamp provided at the forward end thereof has been used with such a bronchoscope. When such an endotracheal tube having a rigid guide tube is used, since a living body into whose trachea the endotracheal tube is inserted through his mouth must hold his head bent rearwardly for a long time during the operation of the bronchoscope, he must bear great pains so as to hold his head bent rearwardly.

On the other hand, a bronchoscope having a controllably bendable tube incorporating therein a flexible image optical system such as a fiber optical system has been recently developed. In using such a bronchoscope having a controllably bendable tube, an yieldably flexible tracheal narcotizing tube insertable into a metallic rigid tracheal tube is used together with the metallic rigid tracheal tube for guiding the forward end portion of the bronchoscope therethrough into the selected one of bronchi, because the flexible narcotizing tube is not provided with a light source. In other words, the flexible narcotizing tube is first inserted into the metallic rigid tracheal tube and then the metallic rigid tracheal tube is inserted into the trachea together with the flexible narcotizing tube, and then the metallic rigid tracheal tube is withdrawn leaving the leaving the flexible narcotizing tube in the trachea, and finally the controllably bendable tube of the bronchoscope is inserted into the flexible narcotizing tube so as to permit the operation of the bronchoscope for the inspection of the bronchus. Thus, the operation is very troublesome and time consuming so that not only great pains are given to the living body to be inspected but also the operator is subjected to great fatigue.

Since the bronchoscope will have to be frequently withdrawn and again inserted into the bronchus so as to clean the forward end portion of the bronchoscope contarninated by the adhesion of foreign material such as phlegm, the above described procedures in using a bronchoscope having a controllably bendable tube are extremely inconvenient and time consurning.

SUMMARY OF THE INVENTION

The primary object of the invention is to obviate the disadvantages of the prior art endotracheal tube and to provide a novel and useful endotracheal tube conveniently usable with either a bronchoscope having a rigid tube and a bronchoscope having a controllably bendable tube.

Therefore, an object of the present invention is to provide a novel and useful endotracheal tube in which the above described disadvantage of the prior art endotracheal tube are eliminated.

Another object of the present invention is to provide a novel and useful endotracheal tube having a flexible tube capable of being stiffened so that not only the operation of a bronchoscope having a controllably bendable tube inserted in the flexible tube is facilitated by the flexure of the flexible tube but also the insertion of the flexible tube of the endotracheal tube into the trachea as well as the operation of a bronchoscope having a rigid tube inserted into the flexible tube is facilitated by stiffening the same.

The objects of the present invention are achieved in accordance with the present invention by the provision of a flexible tube bendable in a plane, a pair of string means extending along the wall of the flexible tube at diametrically opposite positions in the cross-section of the flexible tube in a plane perpendicular to the neutral plane of the flexure of the flexible tube with the forward ends thereof secured to the forward end of the flexible tube and control means provided in a cylindrical guide member forming the control body connected to the rearward end of the flexible tube through a connecting tube member, the rearward ends of the string means being connected to the control means so that the string means are tightened and slackened by the operation of the control means to be maintained in stiffened state without allowing the flexure thereof by tightening the string means for facilitating the insertion of the endotracheal tube into the trachea as well as for facilitating the operation of a bronchoscope having a rigid tube inserted into the endotracheal tube while the operation of a bronchoscope having a controllably bendable tube inserted into the endotracheal tube is facilitated by slackening the string means so as to render the flexible tube of the endotracheal tube to be yielding flexible.

In accordance with the present invention at least one light conducting optical system such as a fiber optical system entending along the wall of the flexible tube of the endotracheal tube in the neutral plane of the flexure of the flexible tube with its forward end terminating at the forward end of the flexible tube while the rearward end thereof is adapted to be supplied with the illuminating light from an external light source at a position adjacent to the connecting tube member so that the light is transmitted through the light conducting optical system to the forward end thereof so as to be emanated therefrom for illuminating the trachea into which the flexible tube of the endotracheal tube is inserted thereby facilitating the insertion of the flexible tube to the desired position in the trachea.

Now a preferred embodiment of the present invention will be described in detail with reference to the accompanying drawings illustrating the same.

DETAILED DESCRIPTION OF THE PREFERRED EMBODIMENT

Figure 1:
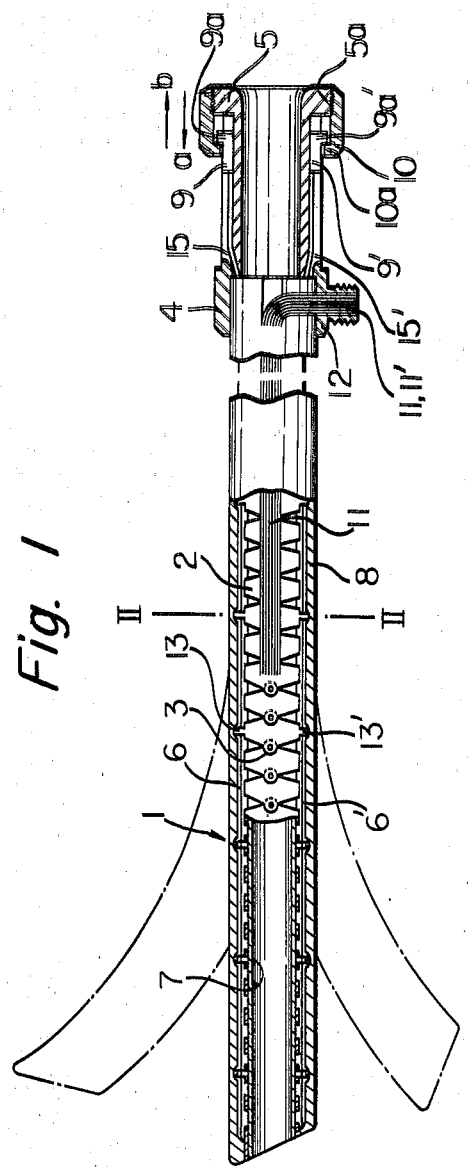
FIG. 1 is a general longitudinal sectional view showing a preferred embodiment of the endotracheal tube constructed according to the present invention.

Referring to the drawings, particularly to FIG. 1, a cylindrical-shaped flexible tube 1 of the endotracheal tube comprises a plurality of ring members 2 arranged in series. Each ring is pivotably connected to the adjacent rings at diametrically opposite positions 3 in the respective end surfaces of the ring members so that the flexible tube can be bent within the plane of flexure of the flexible tube in two opposite directions.

The flexible tube 1 is connected at its rearward end to a connecting tube member 4 which in turn is connected fixedly to a cylindrical guide member 5 constituting the control body of the endotracheal tube.

A pair of string means 6, 6' extend lengthwise in the wall of the flexible tube 1 consisting of the ring members 2, a tubular elastic lining 7 made of a material such as a plastic material and a tubular elastic sheath 8 also made of a material such as a plastic material covering the series of the ring members 2. The forward end of each of the string means 6, 6' is secured to the forward end of the flexible tube 1 while the rearward end of each of the string means 6, 6' is connected to each of a pair of slidable pieces 9, 9'.

Each of the pair of slidable pieces 9, 9' is slidably fitted in the respective longitudinal grooves 15, 15' formed in the periphery of the cylindrical guide member 5 at a diametrically opposite positions thereof and is provided with an outwardly extending projection 9a, 9a'.

An operating nut member 10 is rotatably threaded on a thread 5a formed in the periphery of the cylindrical guide member 5 at the rearward end thereof so that the operating nut member 10 is shifted axially of the cylindrical guide member 5 forwardly and rearwardly by the rotation thereof in either directions as indicated by the reference numeral a and b.

The operating nut member 10 is provided with an inwardly projecting annular flange portion 10a at the front end thereof that the projections 9a, 9a' of the respective slidable pieces 9, 9' engage with the inwardly projecting annular flange portion 10a of the operating nut member 10 from he rearward side thereof when the same is shifted rearwardly by the rotation thereof in one direction, thus the string means 6, 6' are tightened together thereby rendering the flexible tube 1 to be stiffened so as to maintain its straight form without allowing the flexure thereof while the slidable pieces 9, 9' are disengaged from the operating nut member 10 when the same is shifted forwardly by the rotation thereof in the opposite direction thereby permitting the string means 6, 6' to be slackened so that the flexible tube 1 is rendered to be freely bendable.

A pair of fiber optical systems 11, 11' serving as the light conducting optical systems extend lengthwise in the wall of the flexible tube 1 at diametrically opposite positions in the cross-section of the flexible tube 1 in the neutral plane plane of the flexure thereof with the forward ends thereof terminating at the forward end of the flexible tube 1 while the rearward ends thereof are combined together in a mounting 12 formed in the connecting tube member 4 so that the rear ends of the pair of light conducting optical systems 11, 11' are supplied with the illuminating light from an external light source (not shown) when a connecting member of the light source is mounted on the mounting 12. Thus, the light is transmitted through the pair of light conducting optical systems 11, 11' to the forward ends thereof so to be emanated therefrom for illuminating the trachea into which the endotracheal tube is inserted thereby facilitating the insertion thereof.

Figure 2:
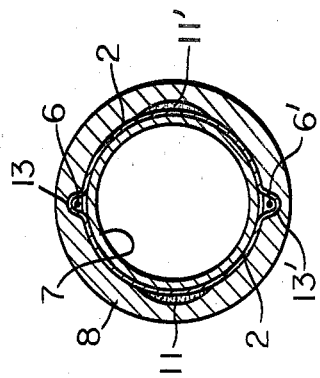
FIG. 2 is a cross-sectional view taken along line II—II in FIG. 1.

In order to prevent the string means 6, 6' from being displaced from the proper peripheral position of the flexible tube 1, protrusions 13, 13' are provided in several of the ring members 2 spaced an appropriate distance from each other in the series of the ring members 2 at diametrically opposite positions thereof as shown in FIG. 2. The protrusions 13, 13' are located in a plane perpendicular to the neutral plane of the flexure of the flexible tube 1 and the respective string means 6, 6' are slidably guided in a throughhold formed within each of the protrusions 13, 13', respectively, so that the string means 6, 6' are guided properly in the peripheral positions of the wall of the flexible tube 1 in a plane perpendicular to the neutral plane of the flexure of the flexible tube.

In operation, the endotracheal tube is first inserted into the trachea through the mouth with a string means 6, 6' tightened by the operation of the nut member 10 so that the flexible tube 1 is rendered to be rigid thereby facilitating the insertion of the endotracheal tube into the trachea to a desired position. The light source connected to the light conducting optical systems 11, 11' is energized so that the trachea is illuminated by the illuminating light transmitted through the light conducting optical systems 11, 11' thereby facilitating the insertion of the endotracheal tube by observing the trachea into which the flexible tube of the endotracheal tube is inserted through the endotracheal tube the flexible tube of which is now held in rigid straight form.

When a bronchoscope having a rigid tube is used, the flexible tube of the endotracheal tube is held in rigid state during the operation of the bronchoscope so that the insertion and withdrawal of the rigid tube of the bronchoscope is facilitated.

When a bronchoscope having a controllably bendable tube is used, the flexible tube of the endotracheal tube is rendered to be flexible by operating the nut member 10 so as to slacken the string means 6, 6' prior to or after the insertion of the controllably bendable tube of the bronchoscope into the endotracheal tube. Thus, the bronchoscope is conveniently operated so as to insert the forward end portion of the bronchoscope into any desired bronchus to be inspected by virtue of the yieldable flexure of the flexible tube of the endotracheal tube. As previously described, the possibility of the yieldable flexure of the endotracheal tube greatly reduces the pains given to the living body to be inspected while the fatigue of the operator is greatly reduced.

As described above, the endotracheal tube of the present invention permits either a bronchoscope having a rigid tube or a bronchoscope having a controllably bendable tube without deteriorating the performance thereof. The provision of the light conducting optical system requires no additional auxiliary light source to be inserted into the trachea together with the endotracheal tube thereby saving the space in the trachea assumed by the elements of the instrument for the observation of the trachea while the pains given to the living body to be inspected are reduced.

I claim:

1. An endotracheal tube for facilitating the insertion of the forward end portion of a bronchoscope therethrough into the selected one of bronchi to be inspected comprising:
    a cylindrical-shaped flexible tube bendable in one plane in opposite directions from a central position;
    a guide member;
    a connecting tube member;
    said flexible tube connected at its rearward end to said guide member forming a control body through said connecting tube member;
    a control means provided in said guide member;
    a pair of string means extending lengthwise along the wall of said flexible tube at diametrically opposite positions in the cross-section thereof in a plane coinciding with the plane of the flexure of said flexible tube with the forward ends of said strings secured to the forward portion of said flexible tube and with the opposite ends connected to said control means;
    said control means including a pair of slidable pieces, each connected to the rearward end of one of said string means and slidably guided longitudinally in each of a pair of longitudinal grooves formed in the peripheral wall of said guide member at diametrically opposite positions thereof; and an operating nut member rotatably mounted on the periphery of said guide member and having engaging means engaged with said slidable pieces, said engaging means being moved axially of said guide member in either of the opposite two directions as said nut member is rotated depending upon the direction of rotation thereof, thereby permitting said slidable pieces to be shifted axially of said guide member forwardly and rearwardly when said nut member is rotated in either of the opposite two direction,
    each of said slidable pieces having an outwardly extending projection which is adapted to be releasably engaged with an inwardly directed annular flange portion formed in said nut member from the rearward side thereof, so that said string means are tightened when said nut member is rotated in one direction while said string means are slackened by rotating said nut member in the opposite direction, thereby permitting said flexible tube to be maintained in stiffened state without allowing the flexure thereof by tightening said string means so as to facilitate the insertion of said flexible tube into the desired position in the trachea while said flexible tube is yieldably bent by slackening said string means thereby facilitating the operation of said bronchoscope inserted through said endotracheal tube.

2. An endotracheal tube according to claim 1, further including at least one light conducting optical system extending lengthwise along the wall of said flexible tube in the plane of the flexure thereof with its forward end terminating at the forward end of said flexible tube while the rearward end is adapted to receive the illuminating light from an external light source at a position adjacent to said connecting tube member so that the light is transmitted through said light conducting optical system to the forward end thereof so as to be emanated therefrom for illuminating the trachea into which the endotracheal tube is inserted, thus facilitating the operation of the same.

3. Endotracheal tube according to claim 2, wherein a pair of light conducting optical systems are provided extending lengthwise in diametrically opposite positions in the cross-section of said flexible tube in the plane of the flexure thereof, the rearward ends of said pair of light conducting optical systems being combined together in a mounting formed in said connecting tube member on which a connecting member of said external light source is detachably mounted so as to supply the illuminating light from said light source to said pair of light conducting optical systems.

4. An endotracheal tube according to claim 1, wherein said flexible tube includes a plurality of ring members arranged in series, each hingedly and pivotably connected to the adjacent ring members at diametrically opposite positions in the respective end surfaces thereof so as to be bent in a plane, and each of said string means is guided through holes formed within protrusions provided at diametrically opposite positions perpendicular to the plane of the flexure of said flexible tube in several of said ring members an appropriate distance spaced from each other in the series thereof, thereby maintaining each of said string means in position in the peripheral direction of said ring members.

* * * * *